Dec. 31, 1946.　　　E. F. HOHWART ET AL　　　2,413,566
RING GAUGE
Filed Nov. 6, 1944
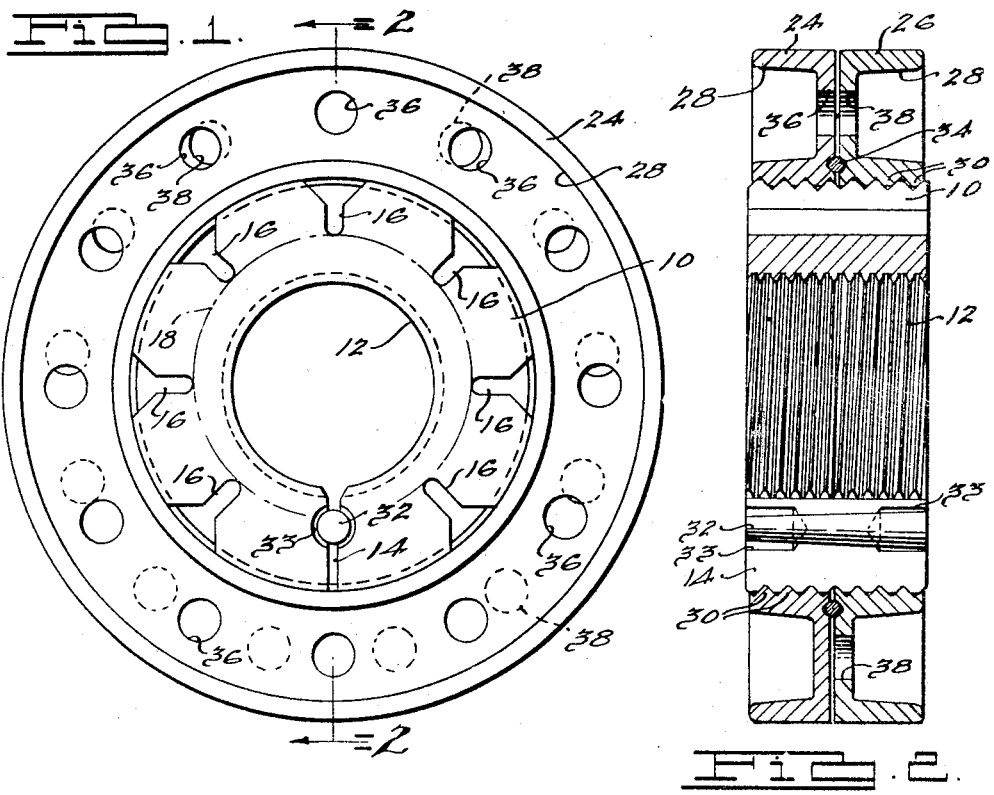
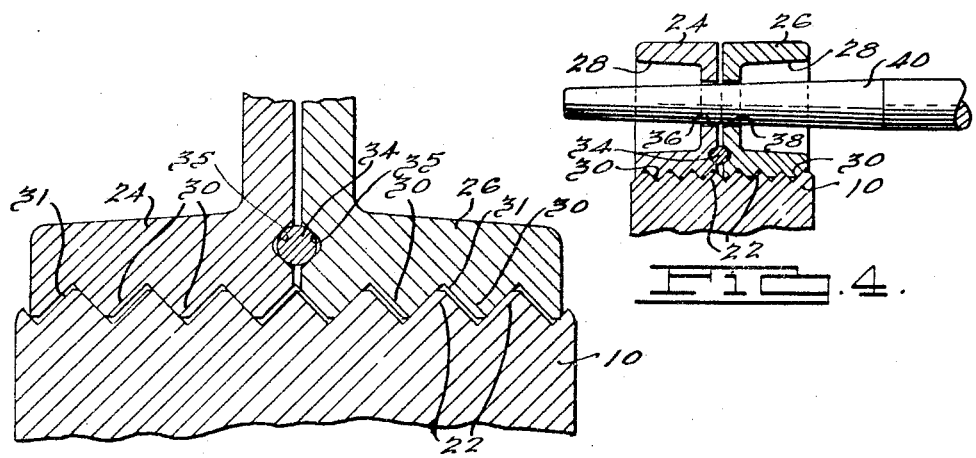
INVENTORS.
George Hohwart,
Ernest F. Hohwart.
BY
Harness, Dickey & Pierce
ATTORNEYS Patented Dec. 31, 1946

2,413,566

UNITED STATES PATENT OFFICE 2,413,566

RING GAUGE

Ernest F. Hohwart, Detroit, and George Hohwart, Orchard Lake, Mich., assignors to N. A. Woodworth Company, Ferndale, Mich., a corporation of Michigan Application November 6, 1944, Serial No. 562,058

10 Claims. (Cl. 33—178)

This invention relates to ring gauges, either of the plain cylindrical or threaded type, and has for its principal object the provision of a new and novel construction for such gauges permitting adjusting of the size of the gauge in a more simple, accurate and secure manner than in those adjustable types of such gauges heretofore provided.

Objects of the invention include the provision of a ring gauge having either a threaded or a plain bore, and hereinafter referred to simply as a ring gauge, including a radially contractible gauging element and a pair of adjusting elements peripherally associated therewith and with each other; the provision of a construction as above described in which the adjusting elements are of a solid or unsplit character; the provision of a construction as above described in which both of the adjusting elements are directly received by the periphery of the gauging element; the provision of a construction as above described in which the adjusting elements are threadably received upon the gauging element and are so constructed and arranged with respect to each other and to the gauging element that the axial force set up by threading one of the elements relatively against the other on the gauging element acts through the threaded connection with the gauging element to produce a radial contracting force upon the gauging element to control the effective diameter of its bore; the provision of a construction as above described including means for maintaining the concentricity of the adjusting elements; the provision of a construction as above described in which a simple and effective means is provided for effecting relative rotation between the adjusting elements; and the provision of a construction as above described in which means are provided for locking the gauging element in predetermined contracted relationship under the influence of the adjusting elements.

Further objects of the invention include the provision of a gauging element of the type described so formed and constructed as to be capable of being contracted in diameter substantially uniformly within reasonable limits; the provision of a gauge element as above described and having a plurality of radially directed slots formed in its radially outer surface, the slots being so proportioned with respect to each other as to cause the gauging element to be uniformly contracted upon the application of a uniform contracting force to its peripheral surface; and the provision of a gauging element as above described provided with means for limiting contraction thereof under the influence of the adjusting elements so arranged as to aid in maintaining the circular conformation of the gauging bore when the latter is contracted.

The above being among the objects of the present invention the same consists in certain novel features of construction and combination of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is an end elevational view of our improved gauge;

Fig. 2 is a transverse sectional view taken axially through the gauge as on the line 2—2 of Fig. 1;

Fig. 3 is an enlarged, fragmentary, sectional view taken in the same plane as Fig. 2 illustrating in exaggerated form the relation between the gauging element and the adjusting elements at their cooperating threaded surfaces through which the effective diameter of the gauging element is controlled; and, Fig. 4 is a fragmentary, sectional view taken in the same plane as Fig. 2 and illustrating the means preferably employed for effecting relative rotation of the adjusting elements on the gauging element.

Conventional adjustable ring gauges, either of the plain cylindrical or threaded type, are conventionally formed from a single piece of metal and provided with a radial slot extending from its periphery to the bore and across which slot an adjusting screw and lock is provided for varying the width of the slot thereby to vary the effective diameter of the gauging bore thereof. Usually the gauging element is provided with one or more additional radial slots extending outwardly from the bore but stopping short of the periphery to impart sufficient flexibility to the gauge to permit variation of the effective diameter of the bore thereof. There are several disadvantages to these conventional types of gauges. One is that the adjustment and lock mechanism across the slot is intended to hold the free ends of the gauge forming the slot against axial displacement with respect to each other but as a matter of fact if such a gauge is dropped or struck against some foreign object one free end is often displaced axially with respect to the other with the result that the effective adjustment of the gauge, and this applies particularly to thread ring gauges, is disturbed inasmuch as the threads at the two free ends are displaced from their originally adjusted position. The result is that conventional types of thread ring gauges must be frequently checked against a master to insure their accuracy.

Moreover conventional types of thread ring gauges necessarily conforming in thickness and external diameters to well recognized standards are relatively heavy.

Another drawback to conventional types of thread ring gauges as above described is that the force of the adjusting pressure is applied only across the slotted ends of the gauge with the result that if the gauge is adjusted materially to either in excess or less than its normal free size the gauging bore is thrown out of true circular relationship.

The difficulties of conventional gauges is overcome in accordance with the present invention by making the gauging element of the gauge of materially smaller diameter than conventional gauges, threading its periphery, and providing a pair of nut-like members threaded upon its periphery. The gauging element itself is radially slotted, and while in the broader aspects of the invention the manner of slotting is immaterial, in accordance with a more limited phase of the invention it is slotted in a predetermined manner from its periphery toward its bore. The nut-like adjusting members when threaded against one another exert an axial pressure upon their corresponding threaded peripheral portions of the gauging element which axial pressure in being transmitted through the threads produces a radial component of such pressure on the gauging element which tends to cause it to be radially contracted. As will be appreciated this radial component is increased by forming the cooperating threads on the gauging element and adjusting elements at a less angle than conventional threads and although conventional threads may be used it is preferable to use, for instance, 90° threads instead of 60° threads to obtain the above described effect. Preferably means are provided for positively limiting the degree of contraction of the radial through slot in the gauging element at any adjustable position of the gauging element and while any suitable means may be provided for this purpose a simple taper pin has been found to be efficient.

Although, as previously mentioned, the two adjusting elements may be threaded on any conventionally or desirably radially slotted gauging element with great advantage, in accordance with a more limited phase of the invention and in order to obtain an even radial contraction of the gauging element itself, the gauge element is provided with a plurality of radial slots extending from its periphery toward but short of its bore. These slots are so formed and arranged as to leave a solid central portion, of greatest thickness opposite the through slot with which the gauge element is provided as in conventional constructions, and which thickness gradually diminishes toward the through slot, the radial slots being governed in depth to obtain this effect.

The above flexibility of the gauging element itself in the above-mentioned respect is, of course, increased in accordance with the present invention over conventional types of ring gauges inasmuch as the gauging element itself is of materially less radial thickness than the corresponding size of conventional ring gauges.

Referring to the accompanying drawing, the gauging element which is indicated generally at 10 comprises an annular member, in this case illustrated as a thread ring gauge and consequently having a threaded bore 12. It is provided with a radial through slot 14 extending from the bore 12 to the periphery thereof. It is also provided with a plurality of, shown as seven, radial slots 16 spaced angularly from each other and from the slot 14 by approximately equal amounts, the slots 16 terminating short of the bore of the element 10 and projecting through the periphery thereof. As plainly indicated in Fig. 1 the slots 16 vary in radial depth and the purpose of this will be brought out later.

The periphery of the member 10 is cylindrical and provided with threads 22. Received on the threaded periphery of the member 10 are two adjusting members or elements 24 and 26 in the form of nut-like members threadably received thereon. The members 24 and 26 in the form shown are of circular formation and are each recessed as at 28 from opposite sides for the purpose of lightness and to minimize heat transfer through them. The peripheries of the elements 24 and 26 may be knurled or serrated if desired. It may be noted that the members 24 and 26 are identical to each other, with the exception of the number of adjusting holes therein as will hereinafter be more fully described, but are mounted in reversed relation to each other on the member 10.

It will be appreciated that the member 10, because of the various slots 16 therein, is capable of being radially contracted or expanded because of the radial flexibility thus imparted to it. It will also be appreciated that when the adjusting members 24 and 26 are threaded upon the member 10 and are threaded into contact, either directly or indirectly, with one another as shown, if in such condition one of the members 24 or 26 is threaded more tightly against the other the force due to such tightening action will, because of the angle of the threads 22 and the cooperating threads 30 on the members 24 and 26, exert a radial component of such force on the member 10 completely around the periphery thereof tending to contract the member 10. This phenomenon is better brought out in Fig. 3 in which the threads 30 of the members 24 and 26 are illustrated as being complementary in section to the threads 22, all threads being of the angular type, that is not the so-called square threads but rather threads the side faces or flanks of which are disposed at an angle to a plane perpendicular to the axis of the threads. The view in Fig. 3 illustrates a condition in which the adjusting members 24 and 26 have been threaded into indirect contact with each other and then the threading on the member 10 continued so as to exert an axial force between the adjusting members 24 and 26. This axial force being transmitted through the threads 30 to the threads 22 of the member 10, which takes the reaction of such axial force, and because of the angular contact between the threads 22 and 30, has forced the member 10 to contract radially under the radial component of such axially directed force between the members 24 and 26, leaving a space 31 between the teeth 22 and 30 on that side of the teeth 22 positioned axially outwardly of the plane of contact of the members 24 and 26.

It will be appreciated that the greater the angularity of the side faces of the threads 22 and 30 the greater will be the radial component of any axial force built up between the adjusting members 24 and 26 and while conventional 60°

V threads may be employed between these members it will usually be found desirable to use a thread of greater angle as, for instance, a 90° thread as shown. It is only necessary, of course, that the outer flanks of the threads 30 and those flanks of the threads 22 facing toward the plane of said thickness of the gauging member 10 be at such angle, but for the purpose of ease in manufacture a V-type of thread is preferably used. It will also be appreciated that as long as the threads on the members 10, 24 and 26 are all of a constant pitch, the fit between such threads is not at all important as in such case regardless of the closeness of fit the threads 30 of the adjusting members 24 and 26 will fully contact the threads of the member 10 either completely around the periphery of the member 10 or at substantially equally spaced points around the periphery, depending upon the degree of contraction of the member 10 from its free condition, so that the radial component of the axial force built up between the adjusting members 24 and 26 will be properly and evenly applied to the member 10.

In practice, while it will be appreciated that where resistance to radial deformation of the member 10 is sufficiently great and the adjusting members 24 and 26 are adjusted to maintain the member 10 in radially contracted relation from its normal free position, the member 10 may be sufficiently rigidly held solely by the adjusting members 24 and 26 to properly function, it will ordinarily be preferred to lock the member 10 against contraction from a radially adjusted position. In order to accomplish this, any suitable form of wedge means may be provided in the through slot 14 to limit or control the width of the slot 14. In the particular case shown, a taper pin 32 is inserted in the slot 14 in axially parallel relation with respect to the member 10, the sides of the slot 14 being shaped for complementary reception of the pin 32. Additionally, and as best brought out in Fig. 2, the ends of the depressions formed for complementary reception of the taper pin 32 in the member 10 are radially relieved as illustrated at 33 so that the expanding force of the pin 32 on the member 10 is exerted midway between the opposite ends thereof, thereby minimizing the possibility of the pin 32 distorting the member 10 out of true cylindrical condition because of improper fit between it and the depressions in the member 10 in which it fits.

Ordinarily the size of the bore 12 of the member 10 will be made at least as great as the largest part intended to be gauged thereby and the gauge contracted to fit smaller parts to be gauged thereby. Under such conditions in order to set the gauge, a master thread gauge plug is made equal to the maximum tolerated size of a part to be gauged and is threaded into the member 10 while the taper pin 32 is either removed or loosened. The adjusting members 24 and 26 are then threaded toward each other until the gauge member 10 is contracted sufficiently to lock the master plug against rotation in the member 10, upon which the taper pin 32 is inserted and tapped home until the member 10 has been expanded just sufficiently to permit the master plug to be turned with the desired amount of resistance in the member 10. The ring gauge thus adjusted is now ready for use. It may be noted that under the above described conditions when the taper pin is driven home it so increases the friction between the threads 22 and 30 that it is substantially impossible to rotate the adjusting members 24 and 26 with respect to each other on the member 10 so that under such conditions it is not necessary to provide any means for mechanically locking the adjusting members against relative rotation with respect to each other. However, any suitable means, such as a bolt passed through aligned holes in the elements 24 and 26 later described in detail, may be provided for this purpose if such precaution is desired.

It will be appreciated, of course, that the amount of radial contraction and expansion which the member 10 is capable of and still be satisfactory for gauging purposes, from a practical standpoint, is relatively small and will usually be not over five one-thousandths of an inch total in a gauge for gauging work up to one inch in diameter. Although such amount of adjustment may appear to be relatively small it does present a problem of maintaining the gauging surface of the member 10 sufficiently circular between opposite limits to still be practical. In other words, it has been found that conventional types of adjustable ring gauges invariably become so out-of-round under a material contraction in adjustment that the desirability of the gauge for accurate gauging purposes is materially impaired. It is, therefore, important that in contracting the gauging member it should be maintained as completely circular as possible so as to provide a maximum amount of contraction between it and the work being gauged thereby.

The particular formation of the gauging element 10 shown and above described is of particular advantage in the last-mentioned respect and this is by reason of the arrangement of the slots described, and the accuracy in this respect is further accentuated by the positioning of the taper pin 32 as shown which, as will be observed, is positioned in the through slot 14 as close to the gauging bore of the member 10 as practical. It will be noted that the depth of the slots 16 decrease more or less gradually from the side of the gauging member 10 in which the through slot 14 is located, toward the opposite side. This has the effect of leaving a solid portion, broken only by the through slot 14, radially inwardly of the slots 16, represented as that area within the dotted line 18 in Fig. 1, which is of greatest radial thickness opposite the slot 14 and decreases in thickness toward the slot 16. Because of this arrangement the bore of the member 10 is maintained extremely close to a true circle over the full permissible degree of adjustment thereof. It has been found that by placing the taper pin 32 in the position shown the thus described maintenance of the true circular condition of the gauging bore 12 is considerably enhanced over a position thereof midway the radial dimensions of the member 10 or radially outwardly therefrom.

In the description so far given it has been assumed that the adjusting members or elements 24 and 26 are screwed into direct contact with one another in adjusting the size of the gauge member 10. While this is satisfactory, it will be appreciated that the same effect may be obtained if a spacer is inserted between the members 24 and 26 as in such case their contact is indirect, instead of direct, and the following claims are to be construed accordingly.

However, it has been found that if the members 24 and 26 are not positively held concentric with one another the gauge member 10 is not maintained as truly circularly during contraction as where such concentricity is maintained.

While any suitable means may be provided to maintain such concentricity of the members 24 and 26, perhaps the simplest means is shown in the drawing as comprising a split wire ring 34 which seats in opposed grooves 35 formed in the opposed faces of the members 24 and 26 and concentric therewith. The grooves 35 are of V-section and thereby act in the nature of V-blocks in receiving the circularly sectioned wire 34 between them and in transmitting the axial pressure of adjustment between the members 24 and 26 to hold them in accurately aligned condition.

By the combination of the above described features it has been found possible to contract the bore of the gage member 10 up to 0.005" with an out-of-roundness of the bore of the member 10 not exceeding 0.0001".

It will be appreciated that the ring 34 spaces the members 24 and 26 from direct contact with one another but that this fact does not affect the previously described functioning of the adjusting members 24 and 26 on the gauge member 10.

While the adjusting members 24 and 26 may be formed in any suitable manner to permit radial adjustment thereof, in accordance with a more limited phase of the present invention the particular means shown comprises a further phase of the present invention and is as follows.

The adjusting member 24 is shown as being provided with a plurality of holes 36 through the web portion thereof in axially parallel relation with respect to the axis of the member 10 and the adjusting rings or members and arranged in a circle concentric with such members. The holes 36 are arranged in equally angularly spaced relation with respect to the axis of the member 24. The adjusting ring 26 is also provided with a plurality of holes 38 arranged around its axis on a circle of the same radius as the circle on which the holes 36 are arranged. There is one more hole 38 than there are holes 36 so that it is not possible to align more than one hole 36 and one hole 38 at one time. A sufficient number of these holes 36 and 38 are provided so that in no case is it possible to so adjust the members 24 and 26 relative to each other as to completely close off all the holes in one of the members.

As a matter of illustration the member 24 is shown as being with twelve equally angularly spaced holes 36 and the member 26 with thirteen equally angularly spaced holes 38. Under such conditions and as illustrated in Fig. 1, two holes, shown as those at the top of the gauge, may be completely aligned with one another, those next adjacent on either side thereof are partially out of alignment, the next holes on either side of the latter are about 50% aligned, etc. If it is desired to adjust the members 24 and 26 circularly with respect to each other on the member 10, then a taper punch or equivalent tool such as illustrated at 40 in Fig. 4 may be inserted in two of the partially aligned holes 36 and 38 and is driven into such holes, the effect being to cause such holes to become aligned and thus to effect relative rotation between the members 24 and 26. The direction of rotation obviously is controlled according to which of the partially aligned holes the taper punch is driven into so that adjustment of the members 24 and 26 in either direction of rotation may thus be controlled. The amount of relative adjustment may be extremely accurately controlled in this manner.

From the above it will be appreciated that in accordance with the present invention an adjustable ring gauge is provided with extremely efficient mechanism for controlling and locking the adjustment thereof and that it provides an exceptional degree of radial adjustment of the gauging element without distorting the true circular conformation thereof to an undesirable degree. It will also be appreciated that with the described form of adjustment and assuming the gauge to be of the thread gauge type, dropping of the gauge or striking it against some foreign object will ordinarily have no effect on the adjusted size of the gauge or the plane alignment thereof as so often occurs with conventional types of thread ring gauges as first-mentioned herein. Furthermore, in view of the fact that with this construction the adjusting members 24 and 26 may be substantially cut-away as at 28 the weight of the gauge of the present invention may be materially reduced as compared to the weight of a similar gauge of conventional construction and this is of advantage both from the standpoint of savings in material and being less tiresome for the operator to use. Additionally, the means provided for effecting adjustment between the adjusting members is simple and efficient.

Having thus described our invention, what we claim by Letters Patent is:

1. An adjustable ring gauge comprising, in combination, an annular gauging member the bore of which provides a gauging surface, said gauging member being provided with a radially directed slot extending therethrough and being provided with a plurality of additional radially directed slots extending radially inwardly from the periphery thereof and terminating short of the bore thereof, the last-mentioned slots being approximately angularly equally disposed with respect to each other, the radial depth of said additional slots varying in accordance with their relation to the first-mentioned slot, such radial depth being greatest in those of said additional slots closest to the first-mentioned slot and least in those slots furthest from said first-mentioned slot, wedge means associated with the walls of said first-mentioned slot for limiting contractive movements thereof, the periphery of said gauging member being cylindrical and threaded, and a pair of adjusting elements each threadably received upon said threaded periphery of said gauging member, the threads of said gauging member and said adjusting elements having flanks disposed at an angle to a plane perpendicular to the axes of said member and elements whereby an axial force set up between said adjusting elements occasioned by threading one toward the other on said gauging member applies a radially contracting force on said gauging member.

2. An adjustable ring gauge comprising, in combination, a radially contractible annular gauging member having a gauging bore and a threaded cylindrical peripheral surface, and a pair of adjusting elements each independently threadably received by said threaded periphery of said gauging member and arranged in axially contacting relation with respect to each other thereon, the flanks of the threads of said gauging member and said adjusting element being disposed at an angle to a plane perpendicular to the axes thereof.

3. An adjustable ring gauge comprising, in combination, a radially contractible annular gauging member having a gauging bore and a cylindrical threaded peripheral surface, a pair of adjusting elements each threadably received upon said periphery of said gauging member, the flanks of the threads of said member and said adjusting elements being disposed at an angle to the axis of said gauge whereby the creation of a force axially of said gauging member caused by threading said adjusting elements toward each other thereon applies a radially contracting force on said gauging member, and means for maintaining said adjusting elements concentric with each other.

4. An adjustable ring gauge comprising, in combination, a radially contractible annular gauging member having a gauging bore and a cylindrical threaded peripheral surface, a pair of adjusting elements each threadably received upon said periphery of said gauging member, the flanks of the threads of said member and said adjusting elements being disposed at an angle to the axis of said gauge whereby the creation of a force axially of said gauging member caused by threading said adjusting elements toward each other thereon applies a radially contracting force on said gauging member, and means for maintaining said adjusting elements concentric with each other comprising a concentric groove formed in that face of each of said adjusting elements opposed to the other thereof, and centering means received between said grooves.

5. An adjustable ring gauge comprising, in combination, a radially contractible annular gauging member having a gauging bore and a cylindrical threaded peripheral surface, a pair of adjusting elements each threadably received upon said periphery of said gauging member, the flanks of the threads of said member and said adjusting elements being disposed at an angle to the axis of said gauge whereby the creation of a force axially of said gauging member caused by threading said adjusting elements toward each other thereon applies a radially contracting force on said gauging member, and means for maintaining said adjusting elements concentric with each other comprising a V-sectioned groove formed in that face of each of said adjusting elements opposed to the other thereof, and a circularly sectioned ring received by said grooves and serving to axially space said adjusting elements.

6. An adjustable ring gauge comprising, in combination, an annular gauging member the bore of which provides a gauging surface, said gauging member being provided with a radially directed slot extending therethrough and being provided with a plurality of additional radially directed slots extending radially inwardly from the periphery thereof and terminating short of the bore thereof, the last-mentioned slots being approximately angularly equally disposed with respect to each other, the radial depth of said additional slots varying in accordance with relation to the first-mentioned slot, such radial depth being greatest in those of said additional slots closest to the first-mentoned slot and least in those slots furthest from said first-mentioned slot, and wedge means interposed between the opposite sides of said through slot and having bearing with said gauging element only in inwardly spaced relation with respect to the axial end faces thereof.

7. An adjustable ring gauge comprising, in combination, an annular gauging member the bore of which provides a gauging surface, said gauging member being provided with a radially directed slot extending therethrough and being provided with a plurality of additional radially directed slots extending radially inwardly from the periphery thereof and terminating short of the bore thereof, the last-mentioned slots being approximately angularly equally disposed with respect to each other about the center of said gauging member, said slots varying in depth so as to leave an unslotted area surrounding the bore of said gauging member which area is of least radial dimension adjacent the first-mentioned slot and gradually increases in radial dimension away from said first-mentioned slot in both directions therefrom.

8. An adjustable ring gauge comprising, in combination, an annular gauging member the bore of which provides a gauging surface, said gauging member being provided with a radially directed slot extending therethrough and being provided with a plurality of additional radially directed slots extending radially inwardly from the periphery thereof and terminating short of the bore thereof, the last-mentioned slots being approximately angularly equally disposed with respect to each other about the center of said gauging member, said slots varying in depth so as to leave an unslotted area surrounding the bore of said gauging member which area is of least radial dimension adjacent the first-mentioned slot and gradually increases in radial dimension away from said first-mentioned slot in both directions therefrom, and wedge means interposed between the opposite sides of said through slot and arranged for movement axially of said gauging member, said wedge means being positioned in closer relationship to the bore of said gauging member than to the periphery thereof.

9. An adjustable ring gauge comprising, in combination, a radially contractible annular gauging member having a gauging bore and a cylindrical threaded peripheral surface, and a pair of adjusting elements each threadably received upon said periphery of said gauging member, the flanks of the threads of said member and said adjusting elements being disposed at an angle to the axis of said gauge whereby the creation of a force axially of said gauging member caused by threading said adjusting elements toward each other thereon applies a radially contracting force on said gauging member, said adjusting elements each having a plurality of equally angularly spaced holes therein arranged in a circle about the axis thereof, the circle of said holes in one of said adjusting elements being of the same diameter as the circle of said holes of the other thereof, one of said adjusting elements having one more of said holes than the other thereof and the number of said holes in each being such that regardless of the relative rotation of said adjusting elements on said gauging member at least one of said holes in one of said elements will be partially aligned with one of said holes in the other of said elements.

10. An adjustable ring gauge comprising, in combination, a radially contractible annular gauging member having a gauging bore and a threaded cylindrical peripheral surface, and a pair of adjusting elements each independently threadably received by said threaded periphery of said gauging member and arranged in axially opposed relation with respect to each other thereon, the flanks of the threads of said gauging member and said adjusting element being disposed at an angle to a plane perpendicular to the axes thereof, each of said adjusting elements serving as an axial stop means on said gauging member limiting axial movement of the other of said adjusting elements on said gauging member in its direction whereby when either of said adjusting elements is limited by the other thereof in its movement on said gauging member towards said other thereof and is turned on said gauging member in a direction tending to move it towards said other thereof without a corresponding turning of said other thereof on said gauging member, the force effecting such turning acting through the threads cooperating between said adjusting elements and said gauging member causes radial contraction of said gauging member.

ERNEST F. HOHWART.
GEORGE HOHWART.